United States Patent
Kommula et al.

(10) Patent No.: US 10,764,249 B1
(45) Date of Patent: Sep. 1, 2020

(54) ANTI-SPOOFING TECHNIQUES FOR OVERLAY NETWORKS

(71) Applicant: Juniper Networks, Inc., Sunnyvale, CA (US)

(72) Inventors: Sunanda L. Kommula, Cupertino, CA (US); Nitin Kumar, Fremont, CA (US); Dmitry A. Shokarev, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 429 days.

(21) Appl. No.: 15/827,927

(22) Filed: Nov. 30, 2017

(51) Int. Cl.
*H04L 29/06* (2006.01)
*G06F 9/455* (2018.01)
*H04L 12/46* (2006.01)

(52) U.S. Cl.
CPC ...... *H04L 63/0236* (2013.01); *H04L 63/0245* (2013.01); *H04L 63/0272* (2013.01); *G06F 9/45558* (2013.01); *G06F 2009/45587* (2013.01); *H04L 12/4641* (2013.01)

(58) Field of Classification Search
CPC ............. H04L 63/0236; H04L 63/0245; H04L 63/0272; H04L 63/029; H04L 63/1466; H04L 12/4641; H04L 12/4633; H04L 2212/00; G06F 9/45558; G06F 2009/45587

See application file for complete search history.

(56) References Cited

PUBLICATIONS

Rosen et al., "BGP/MPLS IP Virtual Private Networks (VPNs)," Network Working Group, RFC 4364, Feb. 2006, 47 pp.
"Securing Transport for IaaS," Data Center Technologists, J-NET Community, Mar. 29, 2017, https://forums.juniper.net/t5/blogs/blogarticleprintpage/blog-id/DCTechnologists/article-id/143, 6 pp.

*Primary Examiner* — Paul E Callahan
(74) *Attorney, Agent, or Firm* — Shumaker & Sieffert, P.A.

(57) ABSTRACT

A network device is configured to receive an inbound packet from a first server device via a network tunnel, the first inbound packet including an outer header, a virtual private network (VPN) label, an inner header, and a data payload, the inner header including an inner source IP address of a source virtual machine. The processors are also configured to determine a first tunnel identifier, determine, based on the inner source IP address, a second tunnel identifier associated with a second server device hosting the source virtual machine, compare the second tunnel identifier with the first tunnel identifier to determine whether the tunnel on which the first inbound packet was received is the same as a tunnel used for forwarding traffic to the source virtual machine, and drop the inbound packet when the second tunnel identifier does not match the first tunnel identifier.

20 Claims, 9 Drawing Sheets

ANTI-SPOOFING TECHNIQUES FOR OVERLAY NETWORKS

TECHNICAL FIELD

This disclosure generally relates to computer networks and, for example, overlay networks in which network packets are transported using network tunnels.

BACKGROUND

A typical cloud data center environment includes many interconnected servers that provide computing (e.g., compute nodes) and/or storage capacity to run various applications. For example, a data center typically includes one or more facilities that hosts applications and services for subscribers, i.e., customers of the data center. The data center, for example, hosts servers for executing the customer applications and includes infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Some such data center environments may provide virtual overlay networks that provide enhanced traffic engineering and network security, allowing different clients to use separate virtual networks across a set of common infrastructure equipment (e.g., shared servers, storage systems, networking equipment). However, the increasing deployments of such cloud data centers present increasing challenges for network security. It may be technically challenging to provide security measures within cloud data centers that can mitigate security vulnerabilities within virtual overlay networks.

SUMMARY

Techniques are described for providing anti-spoofing solutions within overlay networks, such as overlay networks used within cloud data centers. For example, anti-spoofing techniques are described for overlay tunnels within virtualized, multi-tenant networks to detect when malicious sources are injecting traffic onto network tunnels within the overlay network.

As described herein, in one example implementation, a gateway device analyzes network traffic passed between servers in a tunneled overlay network. The gateway device receives network packets from individual servers via uniquely identifiable network tunnels established with each particular server. Packet elements from the inbound packet are analyzed to ensure that the source virtual machine is in the appropriate virtual private network (VPN) and that the source virtual machine is reachable via the same network tunnel from which the packet was received. The gateway device identifies the source tunnel of the inbound Internet Protocol (IP) packet based on the source IP address of the outer header and compares that source tunnel to an expected tunnel identifier of the source virtual machine, as indicated by the source IP address of the inner IP header. The gateway device drops the packet if the source virtual machine is not registered in the VPN or if the source virtual machine is not reachable via the source tunnel. In some examples, each VPN includes a configuration option that identifies whether anti-spoofing is enabled or disabled, and when anti-spoofing is enabled, the additional source IP address lookup is performed in the downstream direction. As such, the gateway device may mitigate aspects of both VPN label spoofing and IP address spoofing.

In one example, the techniques of the disclosure describe a method including receiving, by at least one processor of a network device, a first inbound packet from a first server device. The first inbound packet is received via a network tunnel between the network device and the first server device. The first inbound packet includes an outer header, a virtual private network (VPN) label, an inner header, and a data payload. The outer header includes an outer source IP address of the first server device and an outer destination IP address of the network device. The inner header includes an inner source Internet Protocol (IP) address of a first source virtual machine. The method further includes determining, by the at least one processor and based on the outer source IP address and the outer destination IP address, a first tunnel identifier associated with the network tunnel between the network device and the first server device. The method also includes determining, by the at least one processor and based on the inner source IP address, a second tunnel identifier associated with a second server device hosting the first source virtual machine. The method further includes comparing, by the at least one processor, the second tunnel identifier with the first tunnel identifier to determine whether the tunnel on which the first inbound packet was received is the same as a tunnel used for forwarding traffic to the first source virtual machine. The method also includes dropping, by the at least one processor, the inbound packet when the second tunnel identifier does not match the first tunnel identifier.

In another example, the techniques of the disclosure describe a network device including a plurality of network interfaces communicatively coupled to the plurality of server devices, and one or more hardware-based processors. The processors are configured to receive a first inbound packet from a first server device. The first inbound packet is received via a network tunnel between the network device and the first server device. The first inbound packet includes an outer header, a virtual private network (VPN) label, an inner header, and a data payload. The outer header includes an outer source IP address of the first server device and an outer destination IP address of the network device, the inner header includes an inner source Internet Protocol (IP) address of a first source virtual machine. The processors are also configured to determine, based on the outer source IP address and the outer destination IP address, a first tunnel identifier associated with the network tunnel between the network device and the first server device. The processors are also configured to determine, based on the inner source IP address, a second tunnel identifier associated with a second server device hosting the first source virtual machine. The processors are further configured to compare the second tunnel identifier with the first tunnel identifier to determine whether the tunnel on which the first inbound packet was received is the same as a tunnel used for forwarding traffic to the first source virtual machine. The processors are also configured to drop the inbound packet when the second tunnel identifier does not match the first tunnel identifier.

In another example, the techniques of the disclosure describe a non-transitory computer-readable medium including instructions that, when executed, cause at least one processor to receive a first inbound packet from a first server device. The first inbound packet is received via a network tunnel between the network device and the first server device. The first inbound packet includes an outer header, a virtual private network (VPN) label, an inner header, and a data payload. The outer header includes an outer source IP address of the first server device and an outer destination IP address of the network device, the inner header including an inner source Internet Protocol (IP) address of a first source virtual machine. The instructions also cause the processor to determine, based on the outer source IP address and the outer destination IP address, a first tunnel identifier associated with the network tunnel between the network device and the first server device. The instructions also cause the processor to determine, based on the inner source IP address, a second tunnel identifier associated with a second server device hosting the first source virtual machine. The instructions further cause the processor to compare the second tunnel identifier with the first tunnel identifier to determine whether the tunnel on which the first inbound packet was received is the same as a tunnel used for forwarding traffic to the first source virtual machine. The instructions also cause the processor to drop the inbound packet when the second tunnel identifier does not match the first tunnel identifier.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
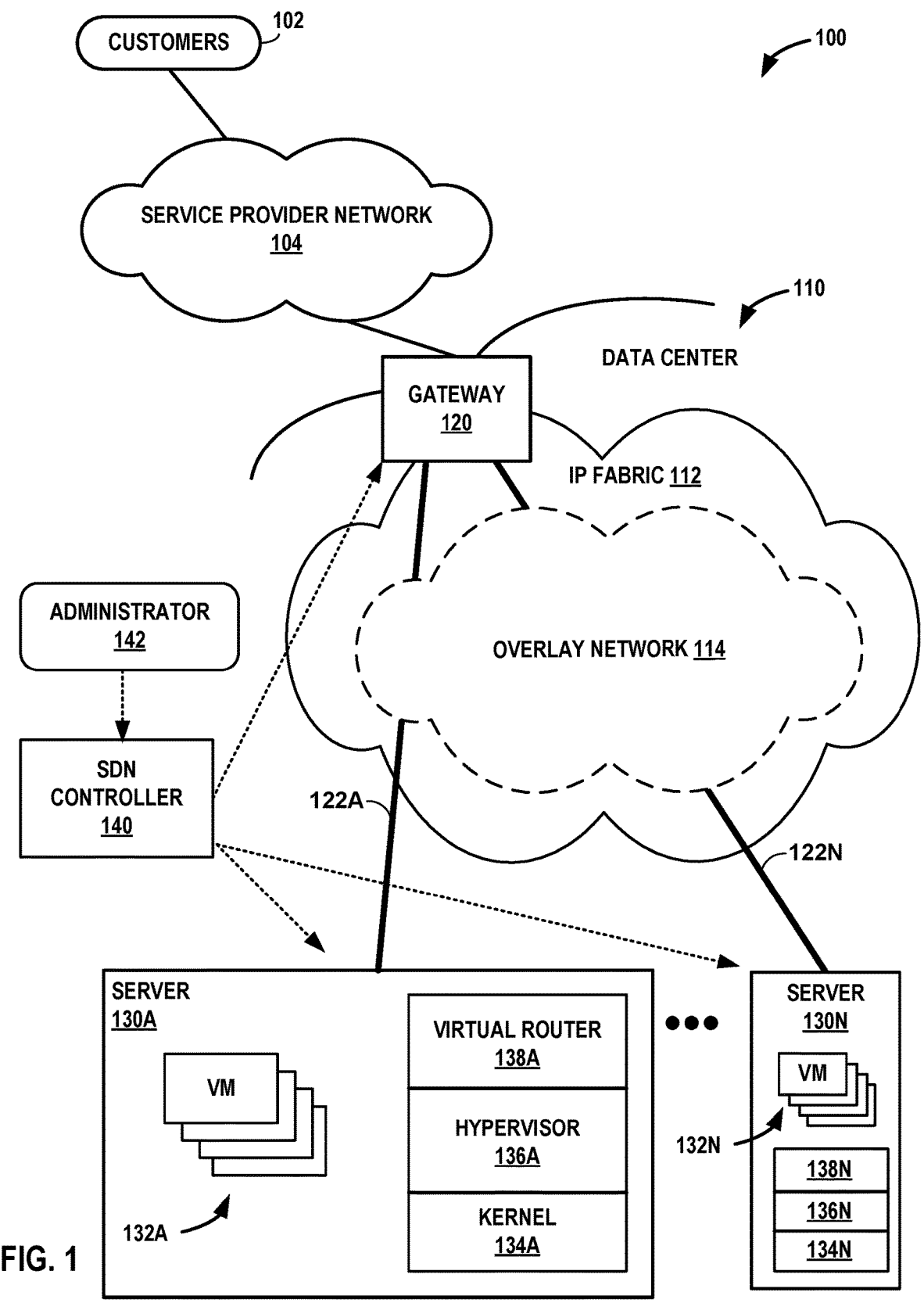
FIG. 1 is a block diagram illustrating an example network having a data center in which examples of the techniques described herein may be implemented.

FIG. 1 is a block diagram illustrating an example network 100 including a data center 110 in which examples of the techniques described herein may be implemented. In general, data center 110 provides an operating environment for applications and services for customers 102 coupled to the data center 110 by service provider network 104. Data center 110 may, for example, host infrastructure equipment, such as networking and storage systems, redundant power supplies, and environmental controls. Service provider network 104 may be coupled to one or more networks administered by other providers, and may thus form part of a large-scale public network infrastructure, e.g., the Internet. Network 100 includes gateway 120 which, in this example, is a perimeter networking device that brokers traffic between service provider network 104 and IP fabric 112, as well as other functionality described herein.

In some examples, data center 110 may represent one of many geographically distributed network data centers. As illustrated in the example of FIG. 1, data center 110 may be a facility that provides network services for customers 102. Customers 102 may be collective entities such as enterprises and governments or individuals. For example, a network data center may host web services for several enterprises and end users. Other example services may include data storage, virtual private networks, traffic engineering, file service, data mining, scientific- or super-computing, and so on. In some embodiments, data center 110 may be individual network servers, network peers, or otherwise.

In this example, data center 110 includes a set of storage systems and application servers 130A-130N (herein, "servers 130") interconnected via high-speed switch fabric 112 provided by one or more tiers of physical network switches and routers. Switch fabric 112 may, for example, be provided by a set of interconnected top-of-rack (TOR) switches (not shown) coupled to a distribution layer of chassis switches (not shown). In some examples, switch fabric 112 may provide IP network connectivity between devices, and may perform layer 3 routing to route network traffic between data center 110 and customers 102 by service provider network 104. As such, switch fabric 112 may sometimes be referred to herein as IP fabric 112. Although not shown, data center 110 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Software-defined network ("SDN") controller 140 provides a logically and in some cases physically centralized controller for facilitating operation of one or more virtual private networks ("VPNs") or overlay networks such as overlay network 114 within data center 110 in accordance with one or more embodiments of this disclosure. In some examples, SDN controller 140 may operate in response to configuration input received from network administrator 142. SDN controller 140 orchestrates overlay network 114 by assigning IP prefixes for customer virtual machines ("VMs") 132 and publishing these prefixes to gateway 120. Further, SDN controller 140 manages label allocation and provisions hypervisor software forwarding state with these labels and tunnels 122 to reach other endpoints within data center 110. Under normal conditions, customer VMs 132 are not privileged to manipulate these labels or change the forwarding state of hypervisor 136.

The various VPNs are collectively embodied, in FIG. 1, as overlay network 114 for ease of discussion. Overlay network 114 allows servers 130 and their associated underlying VMs 132 to communicate with each other on top of switch fabric 112 by, for example, embedding virtual network headers and underlying payloads for several distinct VPNs within layer 3 IP packets of the underlying IP fabric 112. Further, overlay network 114 supports tunneling protocols that are symmetrical in nature (e.g., allowing for the determination of a downstream tunnel from a given upstream tunnel). For example, tunneling protocols may include IP-based tunneling protocols such as, for example, Virtual Extensible LAN (VX-LAN), Generic Routing Encapsulation (GRE), or MPLS-over-UDP tunneling (e.g., where the tunnel is IP- UDP, and the VPN is an NIPLS layer-3 VPN). During operation, gateway 120 constructs individual overlay tunnels 122A-122N (collectively, "tunnels 122") for each of servers 130A-130N (collectively, "servers 130"), respectively. In other words, each of tunnels 122 is terminated by gateway 120 at one end and one of servers 130 at the other end. In some examples, gateway 120 resolves VM prefixes on tunnels 122 to each server 130 and populates these prefixes into the appropriate customer virtual routing and forwarding ("VRF") tables. This example architecture facilitates secure layer-3 VPN connectivity for each customer within datacenter 110. VMs 132 of each particular customer reach each other and external devices across service provider network 104 using tunnels 122 that originate at gateway 120 and terminate at respective hypervisors (not shown in FIG. 1) of servers 130. In this example, each tunnel 122 is uniquely identifiable by a tunnel identifier (ID) (not separately depicted in FIG. 1), and gateway 120 maintains a mapping of each particular tunnel 122 (e.g., MPLS-in-IP-GRE). The tunnel identifier uniquely identifies an end-to-end tunnel 122. The tunnel identifiers are different than VLAN tags, which identify a VLAN. There can be multiple tunnels 122 that are associated with a single VPN and packets through these tunnels may carry the same VLAN tag, but different tunnel identifiers that uniquely identify the respective tunnel within the VPN.

In some examples, a layer-3 VPN is used to segregate customer traffic in overlay network 114. For example, one layer-3 VPN that may be used is Border Gateway Protocol/Multiprotocol Label Switching (BGP/MPLS). BGP/MPLS IP VPNs are described in detail in Rosen & Rekhter, "BGP/MPLS IP Virtual Private Networks (VPNs)," Internet Engineering Task Force Network Working Group, Request for Comments 4364, February, 2006, which is incorporated herein by reference in its entirety (hereinafter "RFC 4364"). An MPLS label is provided as a service label associated with a particular VPN. Further, in some examples, VPN packets are encapsulated with GRE tunnel headers (e.g., MPLS-in-IP-GRE) to provide the server-to-gateway tunnels 122. A BGP/MPLS VPN combines the tunneling processes of, for example, GRE, with virtual routing and forwarding (VRF) and features of BGP to create VPNs. When a VPN is established within a network, devices for the VPN each include VPN-specific VRF tables. Further, each established tunnel 122 is assigned a unique identifier (e.g., 32 bit identifier) that is associated with (e.g., mapped to) at least an IP address of one server 130 and an IP address of gateway 120, and may also include a connection type. As such, and for example, given a server IP address and a gateway IP address, and optionally a tunnel type (e.g., protocol field), the tunnel identifier for that tunnel may be determined by gateway 120 from a mapping of (server IP, gateway IP [, <tunnel type>]) to tunnel ID. During operation, gateway 120 maintains such mappings.

In this example, each of servers 130 include a kernel 134, a hypervisor 136, and a virtual router 138, as well as several VMs 132. Each of servers 130 may host multiple tenants, meaning that VMs 132 on any particular server 130 may be operated by distinct customers. Hypervisor 136 manages creation, maintenance, and decommissioning of VMs 132 based, for example, on customer need, or based on commands from administrator 142. Virtual router 138 executes multiple routing instances for corresponding virtual networks within data center 110 and routes the packets to appropriate VMs 132 executing within the operating environment provided by servers 130. Packets received or transmitted by virtual router 138A of server 130A, for example, from or to switch fabric 112, may include an outer header to allow the physical network fabric to tunnel the payload or "inner packet" to a physical network address for a network interface of server 130A that executes virtual router 138A. The outer header may include the physical network addresses of network interfaces of the corresponding server 130A and gateway 120 (e.g., as source and destination IP addresses, respectively, or vice versa). In some examples, the outer header or the inner packet may expressly include a tunnel ID. In the example, the inner packet includes a virtual network identifier such as a Virtual Extensible LAN (VxLAN) tag or Multiprotocol Label Switching (MPLS) label that identifies one of the virtual networks executed by server 130A as well as the corresponding routing instance executed by virtual router 138A. The inner packet includes an inner header having a destination network address that conforms to the virtual network addressing space for the virtual network identified by the virtual network identifier, along with an inner packet payload (e.g., the data to be sent to the destination device).

Each of servers 130 include a respective virtual routing ("VR") agent (not separately shown) that communicates with SDN controller 140 and, responsive thereto, directs a respective virtual router 138 and gateway 120 so as to control the overlay network 114 and coordinate the routing of data packets within each server 130. The VR agent may install and maintain flow state information for network traffic flows received by virtual router 138 so as to enable virtual router 138 to process and forward received network traffic flows. In general, each VR agent communicates with SDN controller 140, which generates commands to control routing of packets through IP fabric 112.

In accordance with various aspects of the techniques described in this disclosure, gateway 120 analyzes inbound packets from servers 130 to protect against certain types of spoofing attacks. A malicious actor (e.g., with unauthorized access to hypervisor 136A on server 130A) may create or manipulate network packets, exposing various attack scenarios that can lead to unauthorized access to other customer VPNs and their underlying data. For example, a malicious actor may attempt to spoof traffic on another VPN by manipulating VPN labels within network packets (an attack technique referred to herein as "label spoofing"), or may attempt to use unauthorized IP addresses (e.g., stale IP addresses of defunct VMs) (an attack technique referred to herein as "IP address spoofing"). As such, gateway 120 and associated methods described herein provide technical solutions that can help mitigate risk to such exposures.

In one example implementation, when gateway 120 receives an incoming packet from one of the servers 130, gateway 120 decapsulates the packet, determines an original tunnel ID for the packet based on source and destination IP addresses of the outer header, and uses a VPN label within the packet to switch context to the identified VPN in order to route the packet to the appropriate destination VM 132 and associated server 130. In addition, the gateway device also analyzes the virtual source IP from an inner header of the packet to ensure that the given virtual source IP exists within the identified VPN and may further access forwarding information for the identified VPN to confirm, using tunnel identifiers specified for the tunnels within overlay network 114, that the virtual source IP is reachable via the same tunnel upon which the original packet was received. Gateway 120 maintains various information about the VPNs, their various VMs, associated servers and tunnel identifiers, and routing tables for each. If either condition is not met, gateway 120 drops the packet, and may generate an alert as to an attempted spoof. Further, when VMs 132 are terminated, gateway 120 removes those VMs 132 from the associated VPNs. As such, if a later packet is received from that deleted VM 132, gateway 120 identifies that the VM no longer exists within the customer's VPN and drops the packet.

Figure 2:
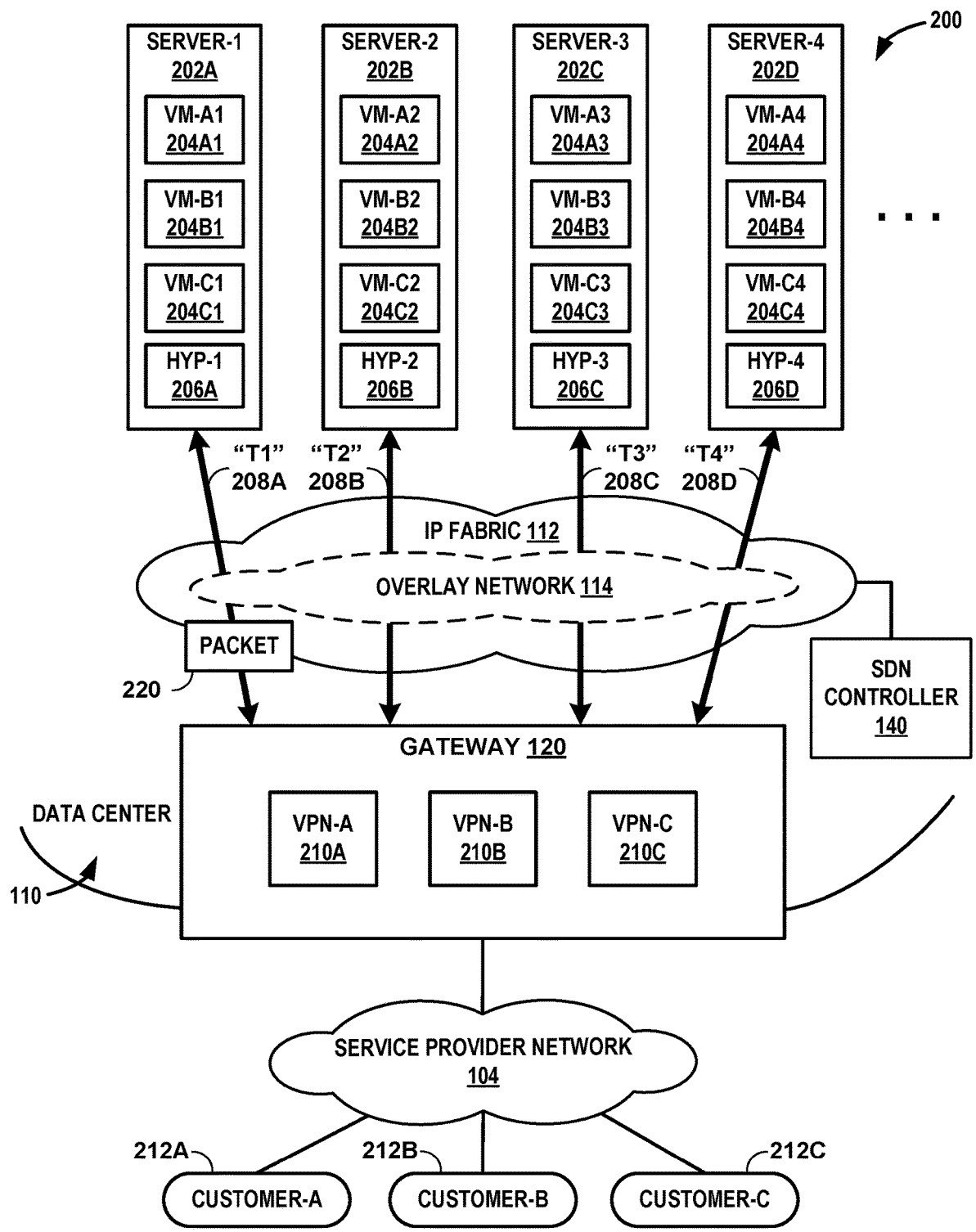
FIG. 2 is a block diagram illustrating an example network in accordance with the techniques of the disclosure.

FIG. 2 is a block diagram illustrating an example network 200 in accordance with the techniques of the disclosure. In some examples, network 200 may be similar to aspects of network 100 shown in FIG. 1, and may include similar components. In this example, network 200 supports three customers, Customer-A 212A, Customer-B 212B, and Customer-C 212C (collectively, "customers 212") in a multi-tenant environment within data center 110. Data center 110 provides multiple servers 202 for executing VMs 204 on behalf of customers 212. Each server 202, in addition to hosting several VMs 204, also includes a hypervisor 206. Hypervisors 206 may be similar to hypervisors 136 shown in FIG. 1. Servers 202 may be similar to servers 130 shown in FIG. 1, and may include other components not shown in FIG. 2.

In this example, each customer 212 has multiple VMs 204 executing on servers 202 within data center 110. For ease of description, each customer 212 is shown as having one VM 204 executing on each server 202, as identified by the lettering of indicia for each particular VM 204. For example, Customer-A 212A controls VM-A1 204A1 executing on Server-1 202A, VM-A2 204A2 executing on Server-2 202B, VM-A3 204A3 executing on Server-3 202C, and VM-A4 204A4 executing on Server-4 202D. Similarly, Customer-B 212B controls VM-B1 204B1, VM-B2 204B2, VM-B3 204B3, and VM-B4 204B4, and Customer-C 212C controls VM-C1 204C1, VM-C2 204C2, VM-C3 204C3, and VM-C4 204C4. However, customers 212 may control any number of VMs 204, and those VMs 204 may be distributed amongst any of servers 202 in any fashion.

Data center 110 also provides multiple VPNs 210 on behalf of customers 212. In this example, each customer 212 is configured with a single VPN 210. For example, Customer-A 212A is provisioned with VPN-A 210A, Customer-B is provisioned with VPN-B 210B, and Customer-C 212C is provisioned with VPN-C 210C. While VPNs 210 are depicted as within gateway 120 of FIG. 2 for ease of illustration, VPNs are provided by overlay network 114 and IP fabric 112 (e.g., as described above with respect to FIG. 1). Each VPN 210 for a given customer 212 allows that customer's VMs 204 to communicate privately with each other, as well as to communicate with external customer devices (generally depicted here as customers 212).

In this example, gateway 120 establishes an overlay tunnel 208 with each particular server 202. Overlay tunnels 208 may be similar to tunnels 122 shown in FIG. 1. During operation, gateway 120 receives inbound packets from servers 202 over VPNs 210. Some inbound packets received by gateway 120 from servers 202 are destined for external devices (e.g., customers 212). In such situations, gateway 120 extracts VPN or overlay network information from the inbound packets, constructs outbound packets for the destination external device, then forwards those new outbound packets out to service provider network 104 for eventual delivery to the intended destination device.

Some inbound packets 220 received by gateway 120 from servers 202 are destined for other internal devices (e.g., servers 202). In accordance with techniques of the disclosure, gateway 120 analyzes these packets 220 to detect and prevent certain spoofing scenarios. For example, gateway 120 may analyze packets 220 to detect IP spoofing, in which a malicious actor may attempt to gain access to a customer's VPN by spoofing IP addresses of decommissioned VMs 204, or to detect VPN label spoofing, in which the malicious actor may attempt to gain access to the customer's VPN by altering a VPN label within packets 220. Gateway 120 maintains a VPN table (not separately depicted) for each VPN 210. Each VPN table identifies which VMs 204 are properly registered as being a part of the particular VPN 210, as well as on which tunnel 208 that VM 204 is reachable. For example, the VPN table for VPN-210A may include:

TABLE 1

Example VPN Table for VPN-A (210A).

| VM Name/IP | Tunnel ID |
|---|---|
| VM-A1 | T1 (208A) |
| VM-A2 | T2 (208B) |
| VM-A3 | T3 (208C) |
| VM-A4 | T4 (208D) |

Column "VM Name/IP" of Table 1 represents a valid VM within Customer-A's VPN, and column "Tunnel ID" represents the tunnel identifier associated with the server hosting that VM. VMs and Tunnel IDs in Table 1 are labeled (e.g., "VM-A1", "T1") for ease of illustration. The example VPN table of Table 1 may be, for example, a VPN virtual routing and forwarding (VRF) of a particular customer's VPN (e.g., of Customer-A 212A) populated on gateway 120 by SDN controller 140. VRF tables typically include a set of routes in which each destination prefix identifies a particular VM 204, and which points to a tunnel next hop that identifies the tunnel parameters and the VPN label. Use of VPN tables by gateway 120 is described in greater detail below.

Figure 3A:
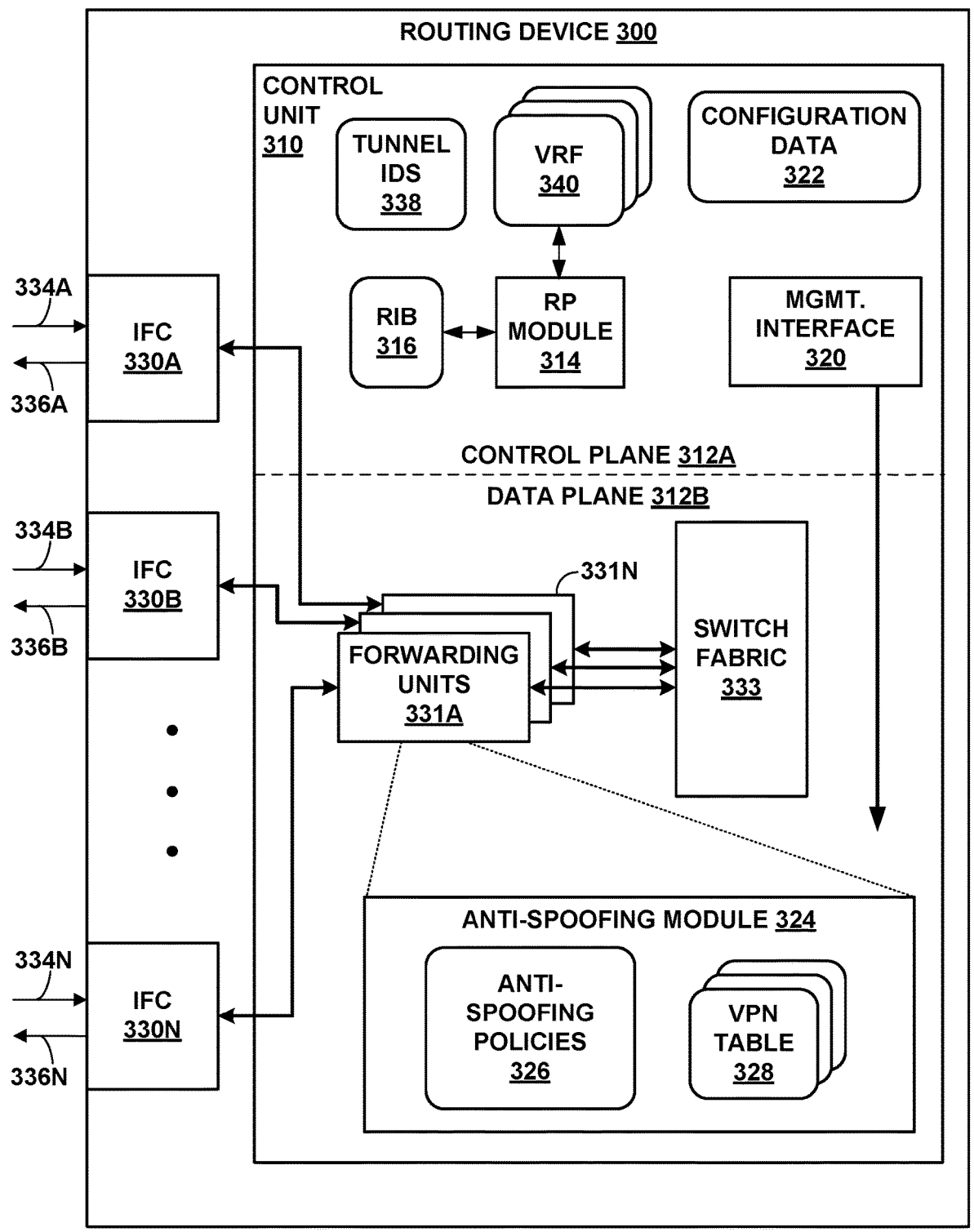
FIG. 3A is a block diagram illustrating an example routing device that performs anti-spoofing techniques in accordance with the principles described herein.

FIG. 3A is a block diagram illustrating an example routing device 300 to perform anti-spoofing techniques on network packets within an overlay network in accordance with techniques described herein. In some examples, routing device 300 may be a provider edge (PE) router within the context of example network 100 of FIG. 1 (e.g., gateway 120), a core edge (CE) router, a core router, or another type of network device.

Routing device 300 includes a control unit 310 and interface cards 330A-330N ("IFCs 330") coupled to control unit 310 via internal links (not shown in FIG. 3A). Control unit 310 may include one or more processors (not shown in FIG. 3A) that execute software instructions, such as those used to define a software or computer program, stored to a computer-readable storage medium (not separately shown), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 310 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 310 is divided into two logical or physical "planes" to include a control plane 312A (also sometimes referred to as a "routing plane") and a data plane 312B (also sometimes referred to as a "forwarding plane"). That is, control unit 310 implements two separate functionalities, e.g., the routing and forwarding functionalities, either logically (e.g., as separate software instances executing on the same set of hardware components) or physically (e.g., as separate physical dedicated hardware components that either statically implement the functionality in hardware or dynamically execute software or a computer program to implement the functionality). Control plane 312A functions provided by control unit 310 include storing network topologies in the form of a routing information base (RIB) 316, executing routing protocols to communicate with peer routing devices to maintain and update RIB 316, and providing a management interface to allow user access and configuration of the network device. Control unit 310 maintains routing information that represents the overall topology of the network (e.g., IP fabric 112, overlay network 114) and defines routes to destination prefixes within the network.

More specifically, control plane 312A of control unit 310 executes the routing functionality of routing device 300. Routing protocol (RP) module 314 of control plane 312A implements one or more routing protocols by which routing information stored in routing information base 316 ("RIB 316") may be determined. RIB 316 may include information defining a topology of a network, such as network 100. Control plane 312A may resolve the topology defined by routing information in RIB 316 to select or determine one or more routes through network 100. Control plane 312A may then update data plane 312B with these routes, where data plane 312B maintains these routes as forwarding information 318.

Control plane 312A further includes management interface 320 (illustrated as "mgmt. interface 320") by which a network management system (e.g., SDN controller 140) or an administrator (e.g., administrator 142) using a command line or graphical user interface, for example, configures anti-spoofing settings or VPN settings on network 100. Configuration data 322 stores configuration data for an anti-spoofing module 324 to a computer-readable storage medium, and control plane 312A configures forwarding information 318 using the stored configuration data to control the functionality of data plane 312B.

Data plane 312B represents hardware or a combination of hardware and software of control unit 310 that provide high-speed forwarding of network traffic, received by IFCs 330 via inbound links 334, to outbound links 336 in accordance with forwarding information 318. Data plane 312B includes a switch fabric 333 communicatively coupling one or more forwarding units 331A-331N ("forwarding units 331"). Each forwarding unit 331 includes, for example, one or more packet forwarding engine ("PFE") coupled to respective IFCs 330. Forwarding units 331 receive and send data packets via interfaces of IFCs 330, where each IFC 330 is associated with a respective one of forwarding units 331. Each of forwarding units 331 and its associated ones of IFCs 330 may represent a separate line card insertable within a chassis (not shown) of routing device 330. Example line cards include flexible programmable integrated circuit (PIC) concentrators (FPCs), dense port concentrators (DPCs), and modular port concentrators (MPCs). Each of IFCs 330 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 331 may comprise more or fewer IFCs. Switch fabric 333 provides a high-speed interconnect among forwarding units 331 for forwarding incoming data packets to an egress forwarding unit of forwarding units 331 for output over a network that includes network device routing device 300. Control unit 310 configures, by sending instructions and other configuration data via the internal communication link, forwarding units 331 to define the packet processing operations applied to packets received by forwarding units 331.

Each forwarding unit of forwarding units 331 includes at least one packet processor (not shown in FIG. 3A) that processes packets by performing a series of operations on each packet over respective internal packet forwarding paths as the packets traverse the internal architecture of router device 300. The packet processor of forwarding unit 331A, for instance, includes one or more configurable hardware chips (e.g., a chipset) that, when configured by applications executing on control unit 310, define the operations to be performed by packets received by forwarding unit 310. Each chipset may in some examples represent a "packet forwarding engine" (PFE). Each chipset may include different chips each having a specialized function, such as queuing, buffering, interfacing, and lookup/packet processing. Each of the chips may represent ASIC-based, FPGA-based, or other programmable hardware logic.

Operations may be performed, for example, on each packet by any of a corresponding ingress interface, an ingress forwarding unit 331, an egress forwarding unit 331, an egress interface or other components of router device 300 to which the packet is directed prior to egress, such as one or more service cards. Packet processors process packets to identify packet properties and perform actions bound to the properties. Each of the packet processors includes forwarding structures that, when executed, cause the packet processor to examine the contents of each packet (or another packet property, e.g., incoming interface) and on that basis make forwarding decisions, apply filters, and/or perform accounting, management, traffic analysis, load balancing, and security, for example. In one example, each of the packet processors analyzes incoming packets for purposes of protecting against spoofing attempts, such as spoofing of VPN labels or of IP addresses. The result of packet processing determines the manner in which a packet is forwarded or otherwise processed by the packet processors of forwarding units 331 from its input interface on one of IFCs 330 to its output interface on one of IFCs 330.

Data plane 312B provides tunneling services to deliver packets over a packet-switched network (e.g., network 100) between servers 130 in IP fabric 112. Control plane 312A may perform setup, maintenance, and tear-down signaling for tunnels 122. Tunnels implemented by data plane 312B may include LSPs as well as GRE, L2TP, and IPsec tunnels. Data plane 312B receives inbound packets 220 on inbound links 334 and analyzes packets 220 for various spoofing scenarios, as described herein, before constructing outbound packets for transmission. Routing device 300 maintains tunnel IDs 338 identifying, for each tunnel, a mapping between a server-side IP address, a gateway-side IP address, optionally a tunnel type, and a particular tunnel ID.

In some examples, IP fabric 112 and routing device 300 implement BGP/MPLS IP VPNs to segregate traffic for different customers by ensuring that routes from different VPNs remain distinct and separate, regardless of whether VPNs for respective customers have overlapping address spaces. For each VPN configured for IP fabric 112 and in which routing device 300 participates, routing device 300 maintains a VPN Routing and Forwarding (VRF) 340 instance. In general, each attachment circuit connecting routing device 300 and a CE device is associated with a VRF. For any given VPN, routing device 300 learns routes for the VPN, in some cases from the CE device, and installs the VPN routes to the corresponding VRF 340, which routing device 300 uses to forward traffic. In addition, routing device 300 distributes learned VPN routes to other PE routers of IP fabric 112 using BGP.

Figure 3B:
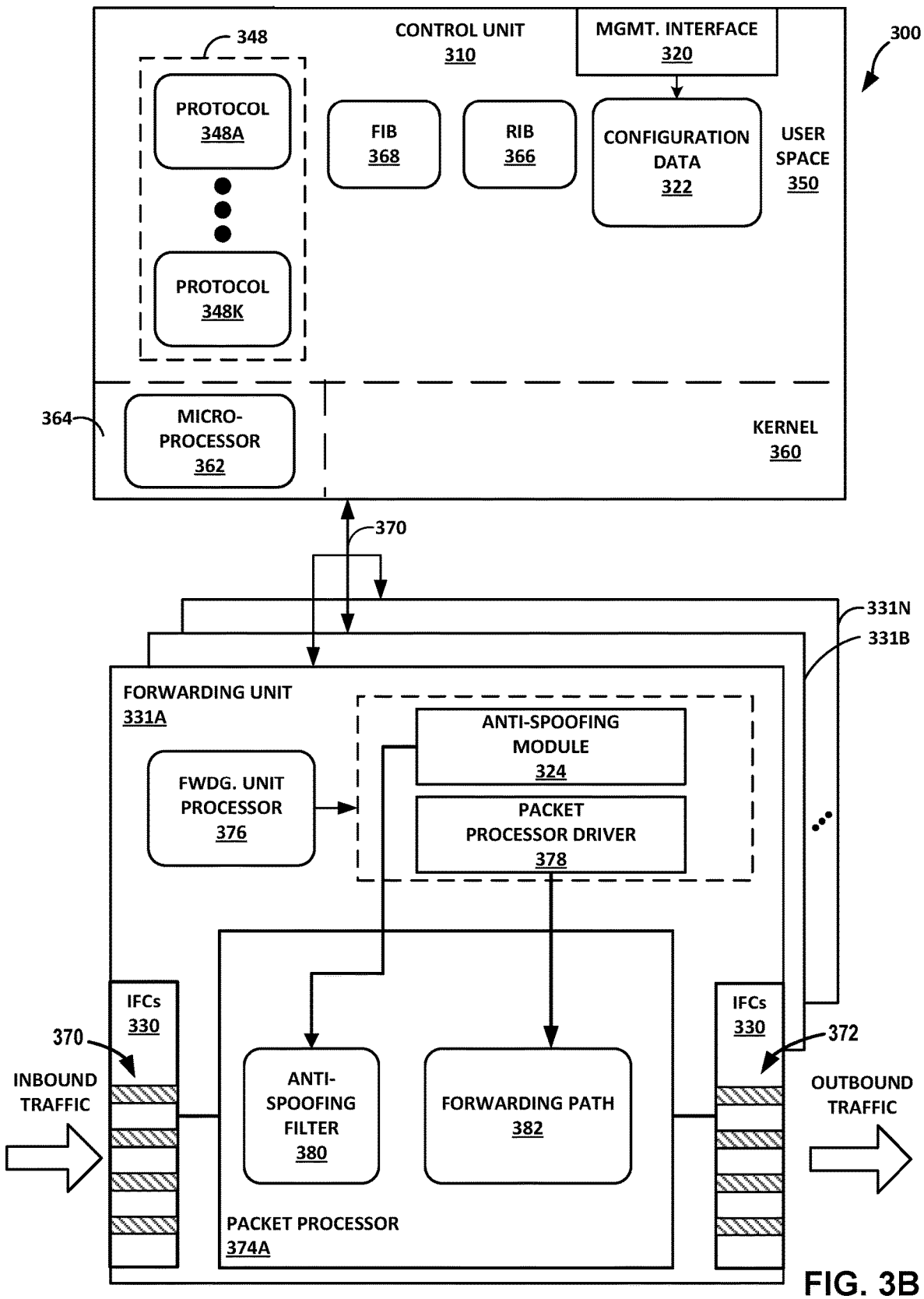
FIG. 3B is a block diagram illustrating, in further detail, the example routing device of FIG. 3A.

FIG. 3B is a block diagram illustrating, in further detail, the example routing device of FIG. 3A. In this example, control unit 310 includes a combination of hardware and software that provides a control plane operating environment for execution of various user-level host applications executing in user space 350. By way of example, host applications may include a management interface process 320 having a command-line interface and/or graphical user interface process to receive and respond to administrative directives, a routing protocol process to execute one or more routing protocols of protocols 348A-348K (collectively, "protocols 348"), and a network management process to execute one or more network management protocols of protocols. In this respect, control unit 310 may provide routing plane, service plane, and management plane functionality for routing device 300.

Management interface 320 executes on and interacts with kernel 360, which provides a run-time operating environment for user-level processes. Kernel 360 may represent, for example, a UNIX operating system derivative such as Linux or Berkeley Software Distribution (BSD). Kernel 360 offers libraries and drivers by which user-level processes may interact with the underlying system. Hardware environment 364 of control unit 310 includes microprocessor 362 that executes program instructions loaded into a main memory (not shown in FIG. 3B) from a storage device (also not shown in FIG. 3B) to execute the software stack, including both kernel 360 and user space 350, of control unit 310. Microprocessor 362 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, a routing protocol process (e.g., RP module 314 of FIG. 3A) executes one or more interior and/or exterior routing protocols to exchange routing information with other network devices and store received routing information in routing information base 366 ("RIB 366"). RIB 366 may include information defining a topology of a network, including one or more routing tables and/or link-state databases. The routing protocol process resolves the topology defined by routing information in RIB 366 to select or determine one or more active routes through the network and then installs these routes to forwarding information base 368 ("FIB 368"). Typically, the routing protocol process generates FIB 368 in the form of a radix or other lookup tree to map packet information (e.g., header information having destination information and/or a label stack) to next hops and ultimately to interface ports of interface cards associated with respective forwarding units 331. Each of forwarding units 331 may be programmed with a different FIB.

Forwarding units 331 and a switch fabric 333 together provide a data plane (e.g., data plane 312B of FIG. 3A) for forwarding network traffic. Forwarding units 331 connect to control unit 310 in this example by communication links 370 (e.g., inbound links 334, outbound links 336), which may represent an Ethernet network.

Each of forwarding units 331 may include substantially similar components performing substantially similar functionality, said components and functionality being described hereinafter primarily with respect to forwarding unit 331A illustrated in detail in FIG. 3B. Forwarding unit 331A receives and sends network packets via inbound interfaces 370 and outbound interfaces 372, respectively, of IFCs 330 of forwarding unit 331A. Forwarding unit 331A also includes packet processor 374A, which represents hardware or a combination of hardware and software that provide high-speed forwarding of network traffic. Likewise, forwarding unit 331B includes packet processor 374B, and so on. In some examples, one or more of forwarding units 331 may each include multiple forwarding components substantially similar to packet processor 374A.

Each of IFCs 330 may include interfaces for various combinations of layer two (L2) technologies, including Ethernet, Gigabit Ethernet (GigE), and Synchronous Optical Networking (SONET) interfaces. In various aspects, each of forwarding units 331 may include more or fewer IFCs 330. In some examples, each of packet processors 374A is associated with different IFCs 330 of the forwarding unit on which the packet processor is located. Switch fabric 333 connecting forwarding units 331 provides a high-speed interconnect for forwarding incoming transit network packets to the selected one of forwarding units 331 for output over one of IFCs 330.

Forwarding units 331 of routing device 300 demarcate a control plane and data plane of routing device 300. That is, forwarding unit 331A performs control plane and data plane functionality. In general, packet processor 374A and IFCs 330 implement a data plane for forwarding unit 331A, while a forwarding unit processor 376 (illustrated as "fwdg. unit processor 376") executes software including anti-spoofing module 324 and packet processor driver 378 within forwarding unit 331A. Control unit 310 also implements portions of control plane 312A of routing device 300. Forwarding unit processor 376 of forwarding unit 331A manages packet processor 374A and executes instructions to provide interfaces to control unit 310 and handle host-bound or other local network packets. Forwarding unit processor 376 may execute a microkernel for forwarding unit 331A. The microkernel executed by forwarding unit processor 376 may provide a multi-threaded execution environment for executing anti-spoofing module 324 and packet processor driver 378. In some examples, forwarding units 331 include multiple network-processors, each of which has a pipeline where packets are processed. In these pipelines, as a part of route lookup features, the anti-spoofing checks are performed before destination route lookup.

Packet processor 374A may include programmable ASIC-based, FPGA-based, or other types of packet processors that process network packets by performing a series of operations on each packet over respective internal packet forwarding paths as the packets traverse the internal architecture of routing device 300. Packet processor 374A includes forwarding structures that, when executed, examine the contents of each packet (or another packet property, e.g., incoming interface) and on that basis make forwarding decisions, apply filters, and/or perform accounting, management, traffic analysis, security analysis (e.g., anti-spoofing), and load balancing, for example. In one example, packet processor 374A analyzes aspects of certain inbound packets 220 from an ingress IFC to detect and mitigate various spoofing attempts before forwarding packets 220 forwarding those packets 220. Anti-spoofing module 324 applies an anti-spoofing filter 380 to detect and drop certain packets that are determined to be malicious (e.g., attempts to spoof VPN labels or virtual IP addresses). For packets that pass the filter, packet processor 374A arranges forwarding structures as next hop data that can be chained together as a series of "next hops" along an internal packet forwarding path 382 for the packet processor 374A. The result of packet processing determines the manner in which a packet is forwarded or otherwise processed by packet processors 374 from its input interface on an ingress forwarding unit of forwarding units 330 to its output interface on an egress forwarding unit of forwarding units 330.

In some examples, packet processor 374A binds actions to be performed on packets received by the packet processor 374A to identification of one or more properties of the packets. That is, upon identifying certain packet properties, packet processor 374A performs the action bound to the properties. Packet properties may include packet metadata such as a particular packet's ingress interface or egress interface (as determined by the PFEs) as well as information carried by the packet and packet header, such as packet header fields, destination route prefixes, layer four (L4) or Transport Layer protocol destination ports, and the packet payload. Actions bound to packet characteristics may include determining whether a packet is a tunneled packet (e.g., via analysis of source IP address, destination IP address, and tunnel type), determining a tunnel identifier associated with tunneled packets (e.g., tunnel IDs 338), determining the source VM from overlayed headers, and determining which packets to drop based on various anti-spoofing policies 326.

More specifically, in accordance with techniques described in this disclosure, anti-spoofing module 324 performs various packet analysis functionality to mitigate various security vulnerabilities. Inbound packets 220 are received from servers 202 via tunnels 208 on inbound links 334. In various examples described below, anti-spoofing module 324 analyzes tunnel information (e.g., outer source and destination IP addresses, connection type), VPN labels (e.g., MPLS label), and VPN header information (e.g., inner source IP address) of packets 220 on packets 220 passed between servers 202 to detect certain types of IP spoofing and VPN label spoofing. Anti-spoofing module 324 includes anti-spoofing policies 326, for example, as defined by administrator 142 via SDN controller 140, or via management interface 320 (e.g., command-line interface). Anti-spoofing policies 326 include an anti-spoofing setting defining whether anti-spoofing module 324 generally performs anti-spoofing analysis of packets 220 and a "strict mode" setting defining whether anti-spoofing module 324 analyzes tunnel information of packets 220 for a given VPN.

In some examples, packet processor 374A executes the following pseudo-code as a part of anti-spoofing filter 380:

```
If packet is tunneled to gateway 120 {
    Terminate tunnel and remove outer header;
    Determine tunnel ID (e.g., from outer header source and dest.
    IP addresses);
    Save tunnel ID;
    If packet has an MPLS label {
        Lookup label to find VPN's VRF;
        Remove VPN label and set VRF context;
        If Anti-spoofing is enabled {
            Lookup source virtual IP address;
            If IP is not found in VPN {
                Drop Packet;
            } else {
                if Anti-spoofing is "strict-mode" {
                    determine tunnel ID associated with source virtual
```

-continued

```
                    IP address;
                    if saved tunnel ID is not equal to determined tunnel ID {
                        Drop Packet;
                    } else {
                        // Anti-spoofing check passed
                        // Proceed to destination lookup
                    }
                }
            }
        }
    }
    Lookup destination virtual IP;
    If destination virtual IP is found {
        Forward the packet;
    } else {
        Drop Packet;
    }
}
```

In some examples, multiple forwarding units 331 may participate in processing a particular inbound packet 220 with respect to performing anti-spoofing filter 380. For example, some inbound packets 220 may be able to be processed by a single forwarding unit 331 (e.g., in the case of "non-anchored" interfaces). For non-anchored interface scenarios, the state of the VRF is present on each of forwarding units 331 and, as such, the single forwarding unit may apply anti-spoofing filter 380 to received packets. Other inbound packets 220 may be initially processed by an ingress forwarding unit 331, but may then be further processed by an egress forwarding unit 331 responsible for transmitting the outbound packet (e.g., in the case of "anchored" interfaces). For anchored interface scenarios, a specific forwarding unit 331 may be used as the egress forwarding unit (e.g., as described by a particular slot, pic, and interface number). As such, the ingress forwarding unit may perform steps up to determining the tunnel ID and analyzing the MPLS label of the packet. Based on the MPLS label, routing device 300 may transmit the determined tunnel ID in a fabric header encapsulating various content of the original packet 220 across switch fabric 333 to the egress forwarding unit. The egress forwarding unit may then complete the remainder of anti-spoofing filter 380, such as performing the source virtual IP lookup, obtaining the tunnel ID from the fabric header, and dropping the packet if the packet does not pass the anti-spoofing filter 380.

In the example, anti-spoofing module 324 also maintains VPN tables 328 for the various defined VPNs 210 within IP fabric 112. For example, VPN tables 328 may be the VRF tables associated with the various VPNs 210, where the VRF tables are populated through BGP, which interacts with a route-reflector, as well as SDN controller 140, which orchestrates the server-side and gateway routing tables. VPN tables 328 define a list of active VMs 204 within the associated VPN 210, as well as a tunnel identifier associated with that VM 204 (e.g., identifying tunnel 208 of the associated server 202 on which the VM 204 is hosted). VPN tables 328 may be updated (e.g., by SDN controller 140, administrator 142) as VMs 204 are commissioned, decommissioned, or migrated between servers 202, or as tunnels 208 are created, changed, or deleted. Table 1, as described above in relation to FIG. 2, is an example VPN table 328.

Figure 4A:
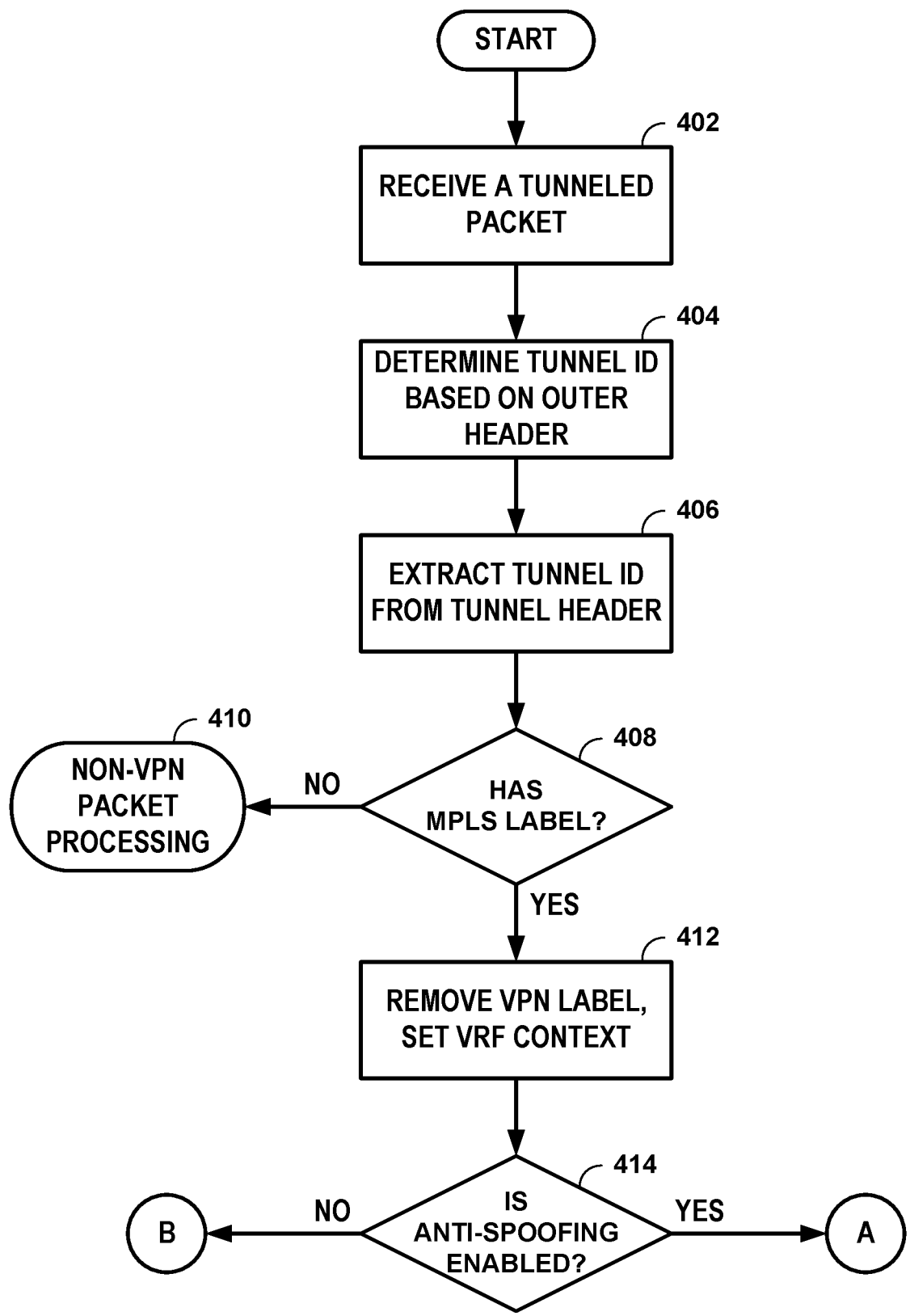
FIGS. 4A and 4B are a flowchart illustrating an example operation in accordance with the techniques of the disclosure.
Figure 4B:
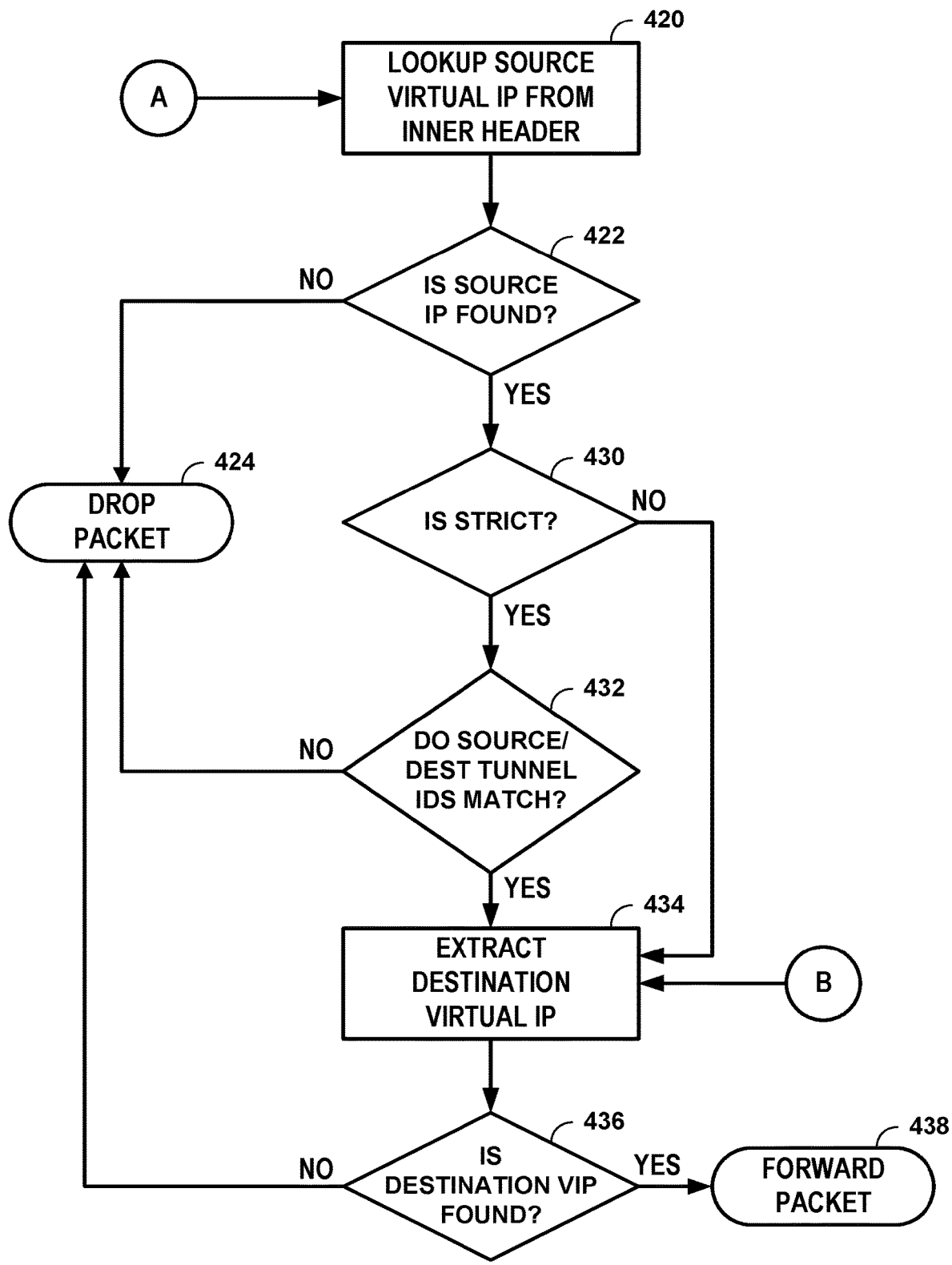

FIGS. 4A & 4B are a flowchart illustrating an example operation in accordance with the techniques of the disclosure. FIGS. 4A & 4B are described with reference to FIG. 2, for convenience. In the example, the operations described in FIGS. 4A and 4B are performed by anti-spoofing module 324 in data plane 312B of gateway 120.

Referring now to FIG. 4A, initially, gateway 120 receives an inbound packet from a server, such as Server-1 202A (404), via tunnel T1 208A. Anti-spoofing module 324 removes an outer header from the packet (404) and determines a tunnel ID based on information contained in the outer header (406). In some examples, the outer header may include a unique tunnel ID associated with tunnel T1 208A. In some examples, anti-spoofing module 324 may determine the tunnel ID associated with the packet based on the source and destination IP addresses of the outer header of the packet, and optionally a connection type. Next, anti-spoofing module 324 examines the inbound packet to determine whether or not the packet has an MPLS label (408). If the inbound packet does not have an MPLS label, then anti-spoofing module 324 processes the remainder of the inbound packet as a non-VPN packet (410).

In this example, if anti-spoofing module 324 determines that the inbound packet has an MPLS label, then anti-spoofing module 324 removes the MPLS label and sets the VRF 340 context to the VPN identified by the MPLS label (412). For example, the MPLS label may identify VPN-A 210A and, as such, the VRF 340 context is configured for the VPN of Customer-A 212A, and anti-spoofing module 324 may use the VPN table 328 for VPN-A 210A as shown in example Table 1. In some examples, anti-spoofing module 324 identifies the VPN with which the inbound packet is associated based on other packet information, such as, for example, a virtual network identifier (VNID) (e.g., as provided by VxLAN). In some examples, anti-spoofing module 324 then determines whether anti-spoofing is enabled (414). This aspect may be optional, and based on configuration. If anti-spoofing is not enabled, then anti-spoofing module 324 skips to operation (434), as described below. If anti-spoofing is enabled, then anti-spoofing module 324 proceeds to operation (420).

Referring now to FIG. 4B, anti-spoofing module 324 extracts a source virtual IP address from an inner header of the inbound packet (420). Using the VPN table 328 for the identified VPN-A 210A (e.g., Table 1, above), anti-spoofing module 324 determines whether or not the source virtual IP address identifies a valid VM within the VPN (422). For example, anti-spoofing module 324 checks whether the source virtual IP address is associated with (assigned to) VM-A1 204A1, VM-A2 204A2, or VM-A3 204A3. If the source virtual IP address is not listed in VPN table 328 as a valid VM, then anti-spoofing module 324 drops the inbound packet (424).

In this example, if the source virtual IP address is listed in VPN table 328, then anti-spoofing module 324 continues to test (430). If, at test (430), anti-spoofing module 324 determines that the identified VPN-A 210A is not set to "strict mode" (e.g., network or customer-specific settings from anti-spoofing policies 326) then anti-spoofing module 324 skips to operation (434), described below. If VPN-A 210a is set to "strict mode," then anti-spoofing module 324 compares the original tunnel ID of the inbound packet to the tunnel ID of the identified VM from VPN table 328 (e.g., the configured tunnel for the VM in Table 1). In some examples, a "next hop" tunnel ID for the source VM may be determined (e.g., from FIB 368). In other words, given the source VM's IP address, anti-spoofing module 324 may determine which tunnel would have been used to transmit a packet to that source VM from FIB 368 for this VPN, and would thus use that tunnel ID to compare to the original tunnel ID. If, at test (432), anti-spoofing module 324 determines that the original tunnel ID of the inbound packet does not match the configured tunnel ID for the VM identified by the source virtual IP address, then anti-spoofing module 324 drops the inbound packet (424).

In this example, if anti-spoofing module 324 determines that the original tunnel ID does match the configured tunnel ID for the identified VM at test (432), or if the identified VPN is not set to strict mode at test (430), or if anti-spoofing is not enabled at test (414), then anti-spoofing module 324 extracts the destination virtual IP address from the inner header of the inbound packet. If, at test (436), the destination virtual IP address is not found, then anti-spoofing module 324 drops the packet (424). If, at test (436), the destination virtual IP address is found, then anti-spoofing module 324 forwards the packet (438).

In some examples, anti-spoofing module 324 may perform operation (432) (checking tunnel IDs) before operation (422) (checking source VIP), but still prior to operation (434).

Figure 5A:
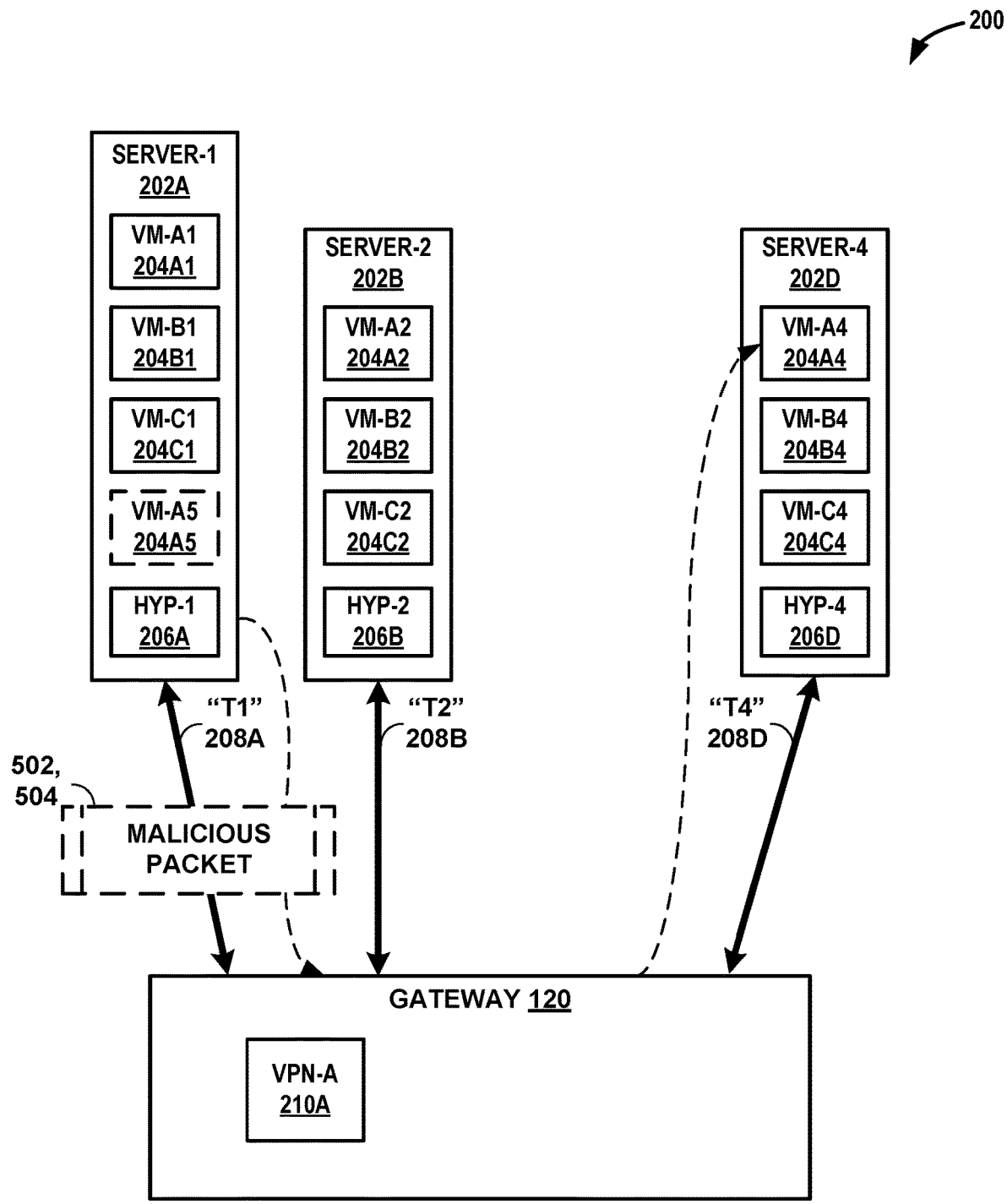
FIG. 5A is a block diagram illustrating example spoofing attempts by a malicious actor.
Figure 5B:
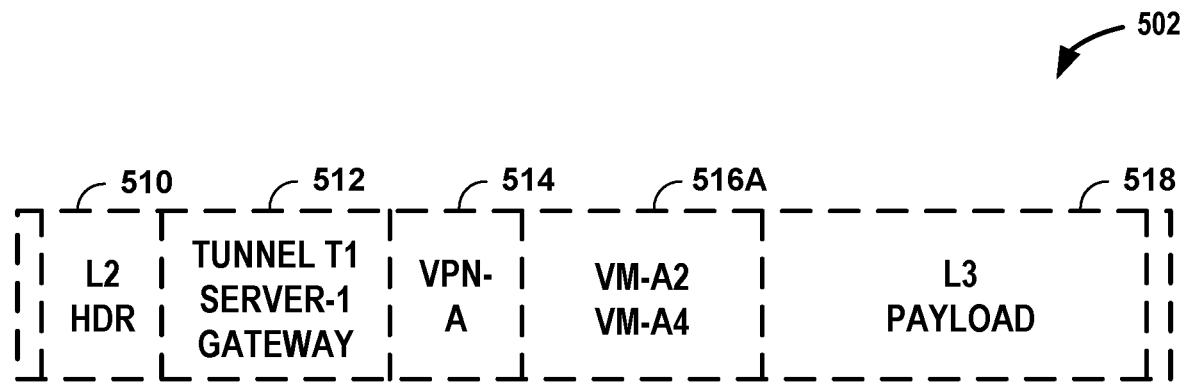
FIGS. 5B and 5C are block diagrams illustrating example packet formats depicting at least some of the contents of malicious packets shown in FIG. 5A.
Figure 5C:
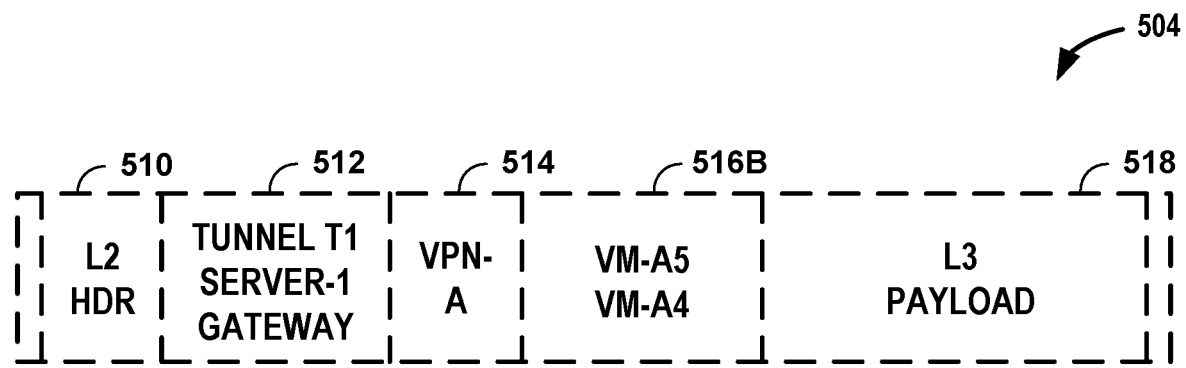

FIG. 5A is a data flow diagram illustrating example spoofing attempts by a malicious actor. In the example spoofing attempts, the malicious actor is manipulating the contents of a malicious packets 502, 504 sent from Server-1 202A in an attempt to access VM-A4 204A4 of Customer-A's VPN (e.g., VPN-A 210A) without authorization. FIGS. 5B and 5C are block diagrams illustrating example packet formats depicting at least some of the contents of malicious packets 502, 504 shown in FIG. 5A. In these examples, anti-spoofing module 324 executes the operational flow described in FIGS. 4A and 4B to frustrate the example spoofing attempts.

Referring now to FIGS. 5A and 5B, in a first example spoofing attempt, the malicious actor is attempting to access VPN-A 210A of Customer-A 212A from Server-1 202A by manipulating the contents of a VPN label field 514 of malicious packet 502, and spoofing as VM-A2. For example, the malicious actor may have unauthorized access to hypervisor-1 206A on Server-1 202A and may introduce packets onto IP fabric 112 and overlay network 114 that do not conform to the VPN security normally imposed on the fabric 112 (e.g., by virtual router 138A). In this example, the malicious actor introduces malicious packet 502 onto the IP fabric 112 bound for VM-A4 204A4. More specifically, malicious packet 502 includes an authentic (e.g., unmanipulated) layer-2 header 510 (e.g., a conventional Ethernet header), an authentic outer header 512 (e.g., an IP header), a VPN label 514 (e.g., an MPLS label), an inner header 516A, and a payload 518. The outer header 512 includes tunnel ID "T1" for tunnel 208A, a "real" source IP address associated with Server-1 202A, and a real destination IP address associated with gateway 120, all of which are unmanipulated in this first example. In this first example, VPN label 514 is manipulated by the malicious actor to identify VPN-A 210A. Inner header 516A includes a source virtual IP address (e.g., of a Customer-A VM on Server-1, such as VM-A1 204A1) and a target virtual IP address of VM-A4 204A4. The layer-3 payload includes upper-layer communications presumably meant to access some exposed service on or access venue into VM-A4 204A4 (e.g., a database listener, an application port, and so forth).

Once constructed, malicious packet(s) are transmitted on IP fabric 112 and make their way through IP fabric 112 to gateway 120. Upon receiving malicious packet 502 (e.g., as "inbound packet" of FIGS. 4A & 4B), anti-spoofing module 324 processes malicious packet 502 to detect the VPN label spoofing attempt. More specifically, anti-spoofing module 324 extracts the "original" tunnel ID "T1" 208A from outer header 512 of malicious packet 502 and changes context to VPN-A 210A based on the contents of VPN label 514. In some examples, the tunnel ID is determined based on the source and destination IP addresses of the outer header. In other examples, the tunnel ID may be explicitly included in outer header 512. Anti-spoofing module 324 then extracts the source virtual IP (VIP) address "VM-A2" from inner header 516A. Using the source VIP, anti-spoofing module 324 searches VPN table 328 for the present context (e.g., Table 1) to verify that the VM identified by the source VIP is in the VPN table. Here, VM-A2 is in Table 1, so anti-spoofing module 324 continues inspecting packet 502. In other words, this example packet 502 does not fail based on an invalid source VIP.

In this example, anti-spoofing module 324 also looks up the expected tunnel ID from VPN table 328 for the present context (e.g., Table 1). In this example, VM-A2 is hosted on Server-2 202B, and VPN table 328 indicates that VM-A2 is associated with tunnel ID "T2" 208B (the "expected tunnel ID"). Anti-spoofing module 324 then compares the original tunnel ID from outer header 512 to the expected tunnel ID from VPN table 328, as identified by the source VIP. In this example, the original tunnel ID identified tunnel "T1" 508A, but the expected tunnel ID for VM-A2 is tunnel "T2" 508B. Accordingly, anti-spoofing module 324 drops malicious packet 502 due to this mismatch, thereby preventing malicious packet 502 from proceeding to its intended destination.

Referring now to FIGS. 5A and 5C, in a second example spoofing attempt, the malicious actor is attempting to access VPN-A 210A of Customer-A 212A from Server-1 202A by manipulating the contents of a VPN label field 514 of malicious packet 502, and spoofing as a stale VM ("VM-A5" 204A5). In this example, VM-A5 204A5 was once a valid VM in VPN-A 210A of Customer-A 212A and, as such, VM-A5 previously had an entry in VPN table 328 of VPN-A 210A. For example, the entry for VM-A5 of Table 1 may have been:

VM-A5 T1 (208A).

However, at some point in the past, VM-A5 was decommissioned and deleted from Server-1 202A, and the malicious actor is now pretending to be that VM. At that time, anti-spoofing module 324 updates VPN table 328 based on the decommissioning of VM-A5, removing the corresponding entry from VPN table 328. For example, when a new VM is commissioned, SDN controller 140 may transmit an update message to gateway 120 indicating that a particular VPN has a new VM (e.g., SDN controller 130 may maintain the VRF of each VPN and transmit a new VRF for that VPN to gateway 120 on any change). When VMs are decommissioned, SDN controller 140 may transmit an update message to gateway 120 indicating that the decommissioned VM has been removed from the particular VPN. As such, in this example, the VPN table of gateway 120 for VPN-A 210A had previously been updated to remove the "VM-A5" entry and, at the time of receipt of malicious packet 504, is as shown in Table 1.

In this second example, the malicious actor is now pretending to be VM-A5 on Server-1 202A in an attempt to gain access to VPN-A 210A. The malicious actor introduces malicious packet 504 onto IP fabric 112 bound for VM-A4 204A4. Malicious packet 504 includes authentic layer-2 (L2) header 510, authentic outer header 512, VPN label 514, an inner header 516B, and payload 518. In this second example, VPN label 514 is manipulated by the malicious actor on Server-1 202A to identify VPN-A 210A. Further, inner header 516B includes a source VIP address identifying VM-A5 204A5 and a target VIP address of VM-A4 204A4.

Upon receiving malicious packet 504, anti-spoofing module 324 processes malicious packet 502 to detect the VPN label and IP address spoofing attempt. More specifically, anti-spoofing module 324 extracts the "original" tunnel ID "T1" 208A from outer header 512 of malicious packet 502 and changes context to VPN-A 210A based on the contents of VPN label 514. Anti-spoofing module 324 then extracts the source virtual IP (VIP) address "VM-A5" from inner header 516. Using the source VIP, anti-spoofing module 324 searches VPN table 328 for the present context (e.g., Table 1) to verify that the VM identified by the source VIP is in VPN table 328. Here, VM-A5 is not in Table 1. As such, anti-spoofing module 324 drops malicious packet 504, thereby preventing malicious packet 504 from proceeding to its intended destination.

Although FIGS. 5A-5C are described for purposes of example with respect to L3 payloads, the techniques of this disclosure may instead be used for VX-LAN with non-L3 payloads, for example. The techniques of this disclosure may be used in an Internet core or data center core, for example.

Figure 6:
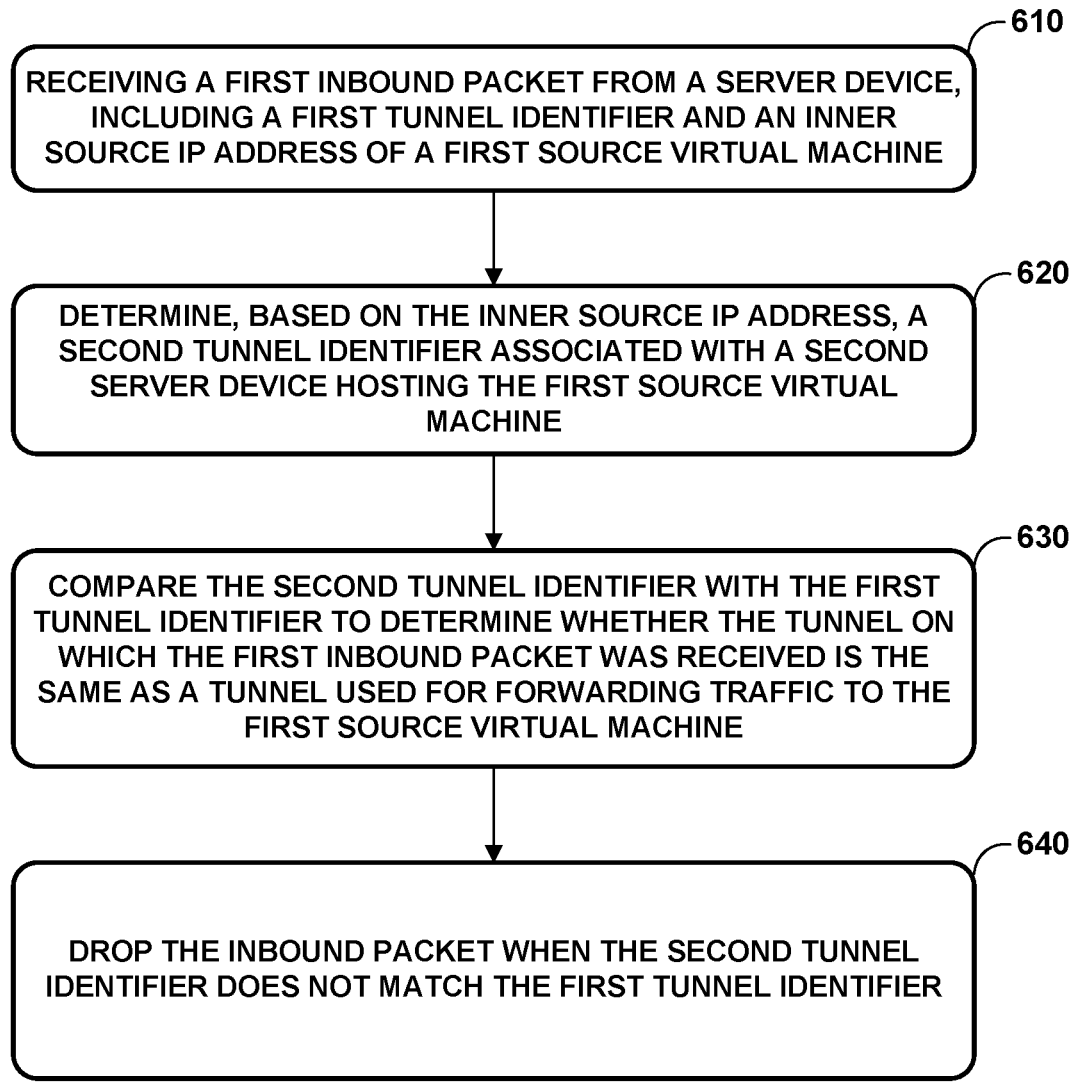
FIG. 6 is a flowchart illustrating an example operation in accordance with the techniques of the disclosure.

FIG. 6 is a flowchart illustrating an example operation in accordance with the techniques of the disclosure. FIG. 6 is described as being performed by anti-spoofing module 324 of FIG. 3, and with reference to FIGS. 4A-4B for convenience.

In normal operation, anti-spoofing module 324 of routing device 300 receives, by at least one processor of a network device, a first inbound packet from a first server device, the first inbound packet being received via a network tunnel between the network device and the first server device (610). The first inbound packet includes an outer header, a virtual private network (VPN) label, an inner header, and a data payload. The outer header including a first tunnel identifier. The inner header including an inner source Internet Protocol (IP) address of a first source virtual machine. Anti-spoofing module 324 also determines, based on the inner source IP address, a second tunnel identifier associated with a second server device hosting the first source virtual machine (620).

In the example, anti-spoofing module 324 compares the second tunnel identifier with the first tunnel identifier to determine whether the tunnel on which the first inbound packet was received is the same as a tunnel used for forwarding traffic to the first source virtual machine (630). In some examples, comparing the second tunnel identifier with the first tunnel identifier is performed by a forwarding plane of a routing device. Anti-spoofing module 324 drops the inbound packet when the second tunnel identifier does not match the first tunnel identifier (640).

In some examples, anti-spoofing module 324 extracts the inner source IP address from the inner header and determines that the inner source IP address is associated with a virtual machine that is configured as a valid member of a first virtual private network of a plurality of virtual private networks. In some examples, anti-spoofing module 324 also extracts the VPN label from the first inbound packet, and wherein determining that the inner source IP address is associated with a virtual machine that is configured as a valid member of the first virtual private network is based on the VPN label extracted from the first inbound packet.

In some examples, anti-spoofing module 324 receives a second inbound packet from a second server device, the second inbound packet being received via a network tunnel between the network device and the second server device, extracts the inner source IP address from the inner header of the second inbound packet, determines that the inner source IP address of the second inbound packet is not associated with a virtual machine that is a valid member of a first virtual private network of a plurality of virtual private networks, and drops the second inbound packet when the inner source IP address of the second inbound packet is determined to not be associated with a virtual machine that is a valid member of the first virtual private network.

In some examples, anti-spoofing module 324 identifies a mapping between a plurality of virtual machines and associated tunnel identifiers (e.g., VPN tables 328), each mapping identifies a mapped virtual machine and a particular tunnel through which the mapped virtual machine communicates with a mapped server device, each virtual machine of the plurality of virtual machines being identifiable by IP address, the mapping including the first source VM being associated with the second server device, and wherein determining the second tunnel identifier is further based on the mapping between first source VM and the second server device. In some examples, anti-spoofing module 324 also receives an update message indicating removal of a decommissioned VM from a specific VPN, and updates the mapping to remove the decommissioned VM from the specific VPN.

In some examples, determining the first tunnel identifier is performed by a first forwarding unit of the network device, the first forwarding unit of the network device being an ingress forwarding unit receiving the first inbound packet, and the method further includes determining, by at least one processor of the first forwarding unit of the network device and based on the VPN label, a second forwarding unit of the network device as an egress forwarding unit to be associated with transmitting an outbound packet associated with the first inbound packet and transmitting the first tunnel identifier and at least a portion of the first inbound packet to the second forwarding unit across an internal switch fabric communicatively coupling the first forwarding unit and the second forwarding unit, wherein comparing the second tunnel identifier with the first tunnel identifier is performed by the second forwarding unit.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
    receiving, by at least one processor of a network device, a first inbound packet from a first server device, the first inbound packet being received via a network tunnel between the network device and the first server device, the first inbound packet including an outer header, a virtual private network (VPN) label, an inner header, and a data payload, the outer header including an outer source Internet Protocol (IP) address of the first server device and an outer destination IP address of the network device, and the inner header including an inner source IP address of a source virtual machine;
    determining, by the at least one processor and based on the outer source IP address and the outer destination IP address, a first tunnel identifier associated with the network tunnel between the network device and the first server device;
    determining, by the at least one processor and based on the inner source IP address, a second tunnel identifier associated with a second server device hosting the source virtual machine;
    comparing, by the at least one processor, the second tunnel identifier with the first tunnel identifier to determine whether the tunnel on which the first inbound packet was received is the same as a tunnel used for forwarding traffic to the source virtual machine; and
    dropping, by the at least one processor, the inbound packet when the second tunnel identifier does not match the first tunnel identifier.

2. The method of claim 1, further comprising:
    extracting, by the at least one processor, the inner source IP address from the inner header; and
    determining, by the at least one processor, that the inner source IP address is associated with a virtual machine that is configured as a valid member of a first virtual private network of a plurality of virtual private networks.

3. The method of claim 2, further comprising:
    extracting the VPN label from the first inbound packet,
    wherein determining that the inner source IP address is associated with a virtual machine that is configured as a valid member of the first virtual private network is based on the VPN label extracted from the first inbound packet.

4. The method of claim 1, further comprising:
    receiving, by the at least one processor, a second inbound packet from a second server device, the second inbound packet being received via a network tunnel between the network device and the second server device;

extracting, by the at least one processor, the inner source IP address from the inner header of the second inbound packet;

determining, by the at least one processor, that the inner source IP address of the second inbound packet is not associated with a virtual machine that is a valid member of a first virtual private network of a plurality of virtual private networks; and dropping, by the at least one processor, the second inbound packet when the inner source IP address of the second inbound packet is determined to not be associated with a virtual machine that is a valid member of the first virtual private network.

5. The method of claim 1, further comprising:

identifying a mapping between a plurality of virtual machines and associated tunnel identifiers, wherein each mapping identifies a mapped virtual machine and a particular tunnel through which the mapped virtual machine communicates with a mapped server device, each virtual machine of the plurality of virtual machines being identifiable by IP address, the mapping including the source virtual machine being associated with the second server device, wherein determining the second tunnel identifier is further based on the mapping between source virtual machine and the second server device.

6. The method of claim 5, further comprising:

receiving an update message indicating removal of a decommissioned VM from a specific VPN; and updating the mapping to remove the decommissioned VM from the specific VPN.

7. The method of claim 1, wherein comparing the second tunnel identifier with the first tunnel identifier is performed by a data plane of the network device.

8. The method of claim 1, wherein determining the first tunnel identifier comprises determining, by an ingress forwarding unit of the network device receiving the first inbound packet, the first tunnel identifier, the method further comprising:

determining, by at least one processor of the ingress forwarding unit of the network device and based on the VPN label, an egress forwarding unit of the network device for transmitting an outbound packet associated with the first inbound packet; and transmitting the first tunnel identifier and at least a portion of the first inbound packet to the egress forwarding unit across an internal switch fabric communicatively coupling the ingress forwarding unit and the egress forwarding unit, wherein comparing the second tunnel identifier with the first tunnel identifier comprises comparing, by the egress forwarding unit, the second tunnel identifier with the first tunnel identifier.

9. A network device comprising:

a plurality of network interfaces communicatively coupled to the plurality of server devices;

a first forwarding unit; and one or more hardware-based processors configured to:

receive a first inbound packet from a first server device, the first inbound packet being received by the first forwarding unit via a network tunnel between the network device and the first server device, the first inbound packet including an outer header, a virtual private network (VPN) label, an inner header, and a data payload, the outer header including an outer source IP address of the first server device and an outer destination IP address of the network device, the inner header including an inner source Internet Protocol (IP) address of a source virtual machine;

determine, based on the outer source IP address and the outer destination IP address, a first tunnel identifier associated with the network tunnel between the network device and the first server device;

determine, based on the inner source IP address, a second tunnel identifier associated with a second server device hosting the source virtual machine;

compare the second tunnel identifier with the first tunnel identifier to determine whether the tunnel on which the first inbound packet was received is the same as a tunnel used for forwarding traffic to the source virtual machine; and drop the inbound packet when the second tunnel identifier does not match the first tunnel identifier.

10. The network device of claim 9, wherein the one or more hardware-based processors are further configured to:

extract the inner source IP address from the inner header; and determine that the inner source IP address is associated with a virtual machine that is configured as a valid member of a first virtual private network of a plurality of virtual private networks.

11. The network device of claim 10, wherein the one or more hardware-based processors are further configured to:

extract the VPN label from the first inbound packet, wherein determining that the inner source IP address is associated with a virtual machine that is configured as a valid member of the first virtual private network is based on the VPN label extracted from the first inbound packet.

12. The network device of claim 9, wherein the one or more hardware-based processors are further configured to:

receive a second inbound packet from a second server device, the second inbound packet being received via a network tunnel between the network device and the second server device;

extract the inner source IP address from the inner header of the second inbound packet;

determine that the inner source IP address of the second inbound packet is not associated with a virtual machine that is a valid member of a first virtual private network of a plurality of virtual private networks; and drop the second inbound packet when the inner source IP address of the second inbound packet is determined to not be associated with a virtual machine that is a valid member of the first virtual private network.

13. The network device of claim 9, wherein the one or more hardware-based processors are further configured to:

identify a mapping between a plurality of virtual machines and associated tunnel identifiers, each mapping identifies a mapped virtual machine and a particular tunnel through which the mapped virtual machine communicates with a mapped server device, each virtual machine of the plurality of virtual machines being identifiable by IP address, the mapping including the first source VM being associated with the second server device, wherein determining the second tunnel identifier is further based on the mapping between first source VM and the second server device.

14. The network device of claim 13, wherein the one or more hardware-based processors are further configured to:

receive an update message indicating removal of a decommissioned VM from a specific VPN; and update the mapping to remove the decommissioned VM from the specific VPN.

15. The network device of claim 9, wherein comparing the second tunnel identifier with the first tunnel identifier is performed in a data plane of the network device.

16. The network device of claim 9, further comprising:
a second forwarding unit; and
an internal switch fabric communicatively coupling the first forwarding unit and the second forwarding unit,
wherein the first forwarding unit is configured to determine the first tunnel identifier, the first forwarding unit of the network device being an ingress forwarding unit receiving the first inbound packet,
wherein the one or more hardware-based processors are further configured to:
determine, by the first forwarding unit and based on the VPN label, the second forwarding unit as being an egress forwarding unit to be associated with transmitting an outbound packet associated with the first inbound packet; and
transmit the first tunnel identifier and at least a portion of the first inbound packet to the second forwarding unit across the internal switch fabric,
wherein the second forwarding unit is configured to compare the second tunnel identifier with the first tunnel identifier.

17. A non-transitory computer-readable storage medium having stored thereon instructions that, when executed, cause a processor of a network device to:
receive a first inbound packet from a first server device, the first inbound packet being received via a network tunnel between the network device and the first server device, the first inbound packet including an outer header, a virtual private network (VPN) label, an inner header, and a data payload, the outer header including an outer source IP address of the first server device and an outer destination IP address of the network device, the inner header including an inner source Internet Protocol (IP) address of a source virtual machine;
determine, based on the outer source IP address and the outer destination IP address, a first tunnel identifier associated with the network tunnel between the network device and the first server device;
determine, based on the inner source IP address, a second tunnel identifier associated with a second server device hosting the source virtual machine;
compare the second tunnel identifier with the first tunnel identifier to determine whether the tunnel on which the first inbound packet was received is the same as a tunnel used for forwarding traffic to the source virtual machine; and
drop the inbound packet when the second tunnel identifier does not match the first tunnel identifier.

18. The non-transitory computer-readable storage medium of claim 17, wherein the instructions further cause the processor to:
extract the inner source IP address from the inner header; and
determine that the inner source IP address is associated with a virtual machine that is configured as a valid member of a first virtual private network of a plurality of virtual private networks.

19. The non-transitory computer-readable storage medium of claim 18, wherein the instructions further cause the processor to:
extract the VPN label from the first inbound packet,
wherein determining that the inner source IP address is associated with a virtual machine that is configured as a valid member of the first virtual private network is based on the VPN label extracted from the first inbound packet.

20. The non-transitory computer-readable storage medium of claim 17, wherein the instructions further cause the processor to:
receive a second inbound packet from a second server device, the second inbound packet being received via a network tunnel between the network device and the second server device;
extract the inner source IP address from the inner header of the second inbound packet;
determine that the inner source IP address of the second inbound packet is not associated with a virtual machine that is a valid member of a first virtual private network of a plurality of virtual private networks; and
drop the second inbound packet when the inner source IP address of the second inbound packet is determined to not be associated with a virtual machine that is a valid member of the first virtual private network.

* * * * *